United States Patent Office 3,247,161
Patented Apr. 19, 1966

3,247,161
STABILIZATION OF RUBBER WITH SYNERGISTIC MIXTURES OF p-PHENYLENEDIAMINES
William L. Cox, Mount Prospect, Ill., assignor to Universal Oil Products Company, Des Plaines, Ill., a corporation of Delaware
No Drawing. Filed Apr. 12, 1961, Ser. No. 102,398
3 Claims. (Cl. 260—45.9)

This application relates to the stabilization of rubber by incorporating therein a novel synergistic mixture, and to the synergistic mixture as a novel composition.

As is now well known, rubber undergoes cracking due to attack by ozone in the atmosphere. In addition, rubber undergoes deterioration due to oxygen in the atmosphere. It has been well established at the present time that the deterioration caused by ozone and the deterioration caused by oxygen are different and that both types of deterioration will occur when both ozone and oxygen are present.

The novel synergistic mixture of the present invention serves to prevent cracking of the rubber due to ozone to a greater extent than is obtained through the use of either of the components of the mixture separately. In addition, the synergistic mixture also serves to retard deterioration of the rubber due to oxidation.

Preferred antiozonants for rubber comprise certain p-phenylenediamines. A particularly preferred antiozonant comprises an N,N'-di-sec-alkyl-p-phenylenediamine in which each alkyl group contains at least 8 carbon atoms. Particularly effective antiozonants comprise N,N'-di-sec-octyl-p-phenylenediamine and N,N'-di-sec-nonyl-p-phenylenediamine. The preferred antiozonants contain from 8 to 12 carbon atoms in each alkyl group and thus also include N,N'-di-sec-decyl-p-phenylenediamine, N,N'-di-sec-undecyl-p-phenylenediamine and N,N'-di-sec-dodecyl-p-pheylenediamine. In some cases the alkyl groups each may contain up to 20 carbon atoms or more and thus will include N,N'-di-sec-tridecyl-p-phenylenediamine,
N,N'-di-sec-tetradecyl-p-phenylenediamine,
N,N'-di-sec-pentadecyl-p-phenylenediamine,
N,N'-di-sec-hexadecyl-p-phenylenediamine,
N,N'-di-sec-heptadecyl-p-phenylenediamine,
N,N'-di-sec-octadecyl-p-phenylenediamine,
N,N'-di-sec-nonadecyl-p-phenylenediamine,
N,N'-di-sec-eicosyl-p-phenylenediamine, etc. While these antiozonants are extremely effective, it is of course desirable to further increase their effectiveness.

Other phenylenediamine antiozonants include N,N'-dicycloalkyl-p-phenylenediamine and particularly N,N'-dicyclohexyl-p-phenylenediamine. Still other phenylenediamine antiozonants comprise N-alkyl-N'-phenyl-p-phenylenediamines including N-isopropyl-N'-phenyl-p-phenylenediamine,
N-sec-butyl-N'-phenyl-p-phenylenediamine,
N-sec-pentyl-N'-phenyl-p-phenylenediamine,
N-sec-hexyl-N'-phenyl-p-phenylenediamine,
N-sec-heptyl-N'-phenyl-p-phenylenediamine,
N-sec-octyl-N'-phenyl-p-phenylenediamine,
N-sec-nonyl-N'-phenyl-p-phenylenediamine,
N-sec-decyl-N'-phenyl-p-phenylenediamine,
N-sec-undecyl-N'-phenyl-p-phenylenediamine,
N-sec-dodecyl-N'-phenyl-p-phenylenediamine, etc.

Surprisingly, it has been found that certain compounds which possess antioxidant properties also produce a synergistic effect when used in combination with the antiozonants hereinbefore set forth. As will be shown by the examples appended to the present specifications, these additional compounds in themselves possess substantially no antiozonant properties. Therefore, it is surprising that they should increase the antiozonant properties of the antiozonants hereinbefore set forth.

These additional compounds are antioxidants and therefore will contribute antioxidant properties to the rubber, in addition to their synergistic effect in enhancing the antiozonant properties of the p-phenylenediamine antiozonants hereinbefore set forth.

The compounds contributing to the synergistic effect are N-phenyl-N'-alkylphenyl-p-phenylenediamines. Illustrative compounds include N-phenyl-N'-methylphenyl-p-phenylenediamine,
N-phenyl-N'-ethylphenyl-p-phenylenediamine,
N-phenyl-N'-propylphenyl-p-phenylenediamine,
N-phenyl-N'-butylphenyl-p-phenylenediamine,
N-phenyl-N'-pentylphenyl-p-phenylenediamine,
N-phenyl-N'-hexylphenyl-p-phenylenediamine,
N-phenyl-N'-heptylphenyl-p-phenylenediamine,
N-phenyl-N'-octylphenyl-p-phenylenediamine,
N-phenyl-N'-nonylphenyl-p-phenylenediamine,
N-phenyl-N'-decylphenyl-p-phenylenediamine,
N-phenyl-N'-undecylphenyl-p-phenylenediamine,
N-phenyl-N'-dodecylphenyl-p-phenylenediamine, etc.

It is understood that mixtures of the N-phenyl-N'-alkylphenyl-p-phenylenediamines may be used and in some cases are preferred. For example, a product being sold commercially by Goodyear Tire and Rubber Company under the trade name of "Wingstay 100" for use as an antioxidant in rubber comprises a mixture of N-phenyl-N'-alkylphenyl-p-phenylenediamines and predominates in N-phenyl-N'-ethylphenyl-p-phenylenediamine.

From the above discussion it will be seen that the present invention provides a novel synergistic mixture of a p-phenylenediamine antiozonant and a N-phenyl-N'-alkylphenyl-p-phenylenediamine.

In another embodiment the present invention relates to a method of stabilizing rubber against cracking due to ozone which comprises incorporating therein an antiozonant mixture of a N,N'-di-sec-alkyl-p-phenylenediamine and an N - phenyl-N'-alkylphenyl-p-phenylenediamine in synergistic proportions.

As hereinbefore set forth, the components are used in synergistic proportions. In one embodiment these may comprise from about 5% to about 95% of one component and from about 95% to about 5% of the other component. In most cases it is preferred to utilize these components in concentrations of from about 25% to about 75% of one component and from about 75% to about 25% of the other component. In a particularly preferred embodiment, the p-phenylenediamine antiozonant comprises from about 50% to about 90% and the N - phenyl - N'-alkylphenyl-p-phenylenediamine comprises from about 50% to about 10% by weight of the synergistic mixture.

The synergistic composition of the present invention is used in rubber in a concentration sufficient to effect the desired stabilization. The concentration may range from about 0.5% to about 5% and more particularly from about 1.5% to about 3% by weight of the rubber, although, in some cases higher or lower concentrations may be employed. These concentrations are based on the rubber hydrocarbon exclusive of the other components of the rubber composition and are used in this manner in the present specifications and claims. When desired, the synergistic mixture may be used along with an additional antioxidant and also is used along with other additives incorporated in rubber for specific purposes including accelerators, softeners, extenders, wax, reinforcing agents, etc.

When used along with an additional antioxidant, it is understood that any suitable antioxidant may be employed including, for example, phenyl-beta-naphthylamine, 6 - phenyl - 2,2,4-trimethyl-1,2-dihydroquinoline, marketed under the trade name of "Santoflex-B," 2,2'-methylene - bis - (4-methyl-6-tert-butyl-phenol), 2,6,-di-tert-butyl-p-cresol, the reaction product of acetone and diphenylamine, marketed under the trade name of "B.L.E.," etc. These antioxidants generally are used in a concentration of from about 0.5% to about 3% by weight of the rubber.

When desired, the synergistic mixture of the present invention also is used along with paraffin and/or microcrystalline wax. The wax generally is utilized in a concentration of from 0.5% to 3% by weight of the rubber.

In one embodiment the components of the synergistic mixture are added separately to the rubber formula. In another embodiment the components of the synergistic mixture are combined and then added to the rubber formula. In still another embodiment the synergistic mixture is admixed with the additional antioxidant, wax and/or other additives, and the mixture then is composited with one or more of the other components of the rubber formulation. In a preferred embodiment the synergistic mixture is incorporated in the latex prior to milling. In still another embodiment vulcanized rubber may be soaked, dipped or suspended in the synergistic mixture to apply a surface coating to the rubber, or the synergistic mixture may be sprayed, poured or otherwise contacted with the previously vulcanized rubber.

The synergistic mixture of the present invention is utilized in any rubber formulation subject to ozone cracking, including those used for automobile and truck tires and tubes, hose, belting, sheet and thread rubber, rubberized fabrics, molded goods, boots and shoes, etc., whether vulcanized in a mold, in open steam, in hot air, or in the cold by the so-called acid process. In another embodiment, the present invention can be utilized for the stabilization of adhesives, elastomers, etc., which tend to crack due to ozone.

When the synergistic mixture is added to a liquid such as rubber pigment or an oil, it is dissolved therein in the desired proportions. When the synergistic mixture is added to a solid substrate, it is incorporated therein by milling, mastication, etc. The synergistic mixture may be utilized as such or as a solution or dispersion or as a powder, paste, etc.

In general, rubber is classified as a vulcanizable diene hydrocarbon rubber and comprises polymers of conjugated 1,3-dienes either as polymers thereof or as copolymers thereof with other polymerizable compounds. In one embodiment the rubber is a synthetic rubber including, for example, butadiene-styrene copolymer rubber presently referred to in the art as SBR rubber, Buna-N rubber (NBR) produced from butadiene and acrylonitrile, butyl rubber produced from butadiene and isobutylene, neoprene, etc. The natural rubbers include Hevea rubber, caoutchouc, balata, gutta-percha, etc. It is understood that the term rubber as used in the present specifications and claims is intended to include both synthetic rubber and natural rubber which undergo cracking due to ozone.

The following examples are introduced to illustrate further the novelty and utility of the present invention but not with the intention of unduly limiting the same.

*Example I*

The base rubber used in this and some of the following examples had the following recipe:

TABLE I

| Ingredient: | Parts by weight |
|---|---|
| SBR-1502 | 100 |
| Furnace black | 40 |
| Circosol 2XH (oil) | 10 |
| Zinc oxide | 3 |
| Stearic acid | 2 |
| Sulfur | 2 |
| Accelerator * | 1.25 |

* N-cyclohexyl-2-benzothiazole-sulfenamide.

A sample of rubber of the above recipe was used as the blank or control sample. Various combinations of additives were incorporated to other samples of the rubber during milling, as will be specifically set forth below. All of the samples were formed into strips 6" long, 0.75" wide and 0.080" thick and cured individually for 40 minutes at 140° C. The different samples were elongated 10% or 20% and evaluated in an ozone cabinet at 100° F. in an atmosphere containing 50 parts of ozone per 100 million parts of air. The time to first visible cracks was determined and is reported in the following examples.

The antiozonant used in this example was N,N'-di-3-(5-methylheptyl)-p-phenylenediamine. The synergistic compound was "Wingstay 100" which, as hereinbefore set forth, comprises N-phenyl-N'-alkylphenyl-p-phenylenediamine predominating in N-phenyl-N'-ethylphenyl-p-phenylenediamine. The results of runs in the ozone cabinet of different samples containing a variety of combinations of additives are reported in the following tables. In the interest of simplicity, N,N'-di-3-(5-methylheptyl)-p-phenylenediamine is abbreviated DMHPPD.

Table II reports results in which the rubber samples were elongated 10%. Table III reports results in which the rubber samples were elongated 20%.

TABLE II

| Run No. | Additive | Concentration (Pts. by Wt.) | Hours to First Crack |
|---|---|---|---|
| 1 | None | | <2 |
| 2 | DMHPPD* | 1.5 | 3 |
| 3 | Wingstay 100 | 1 | <2 |
|   |   | 2 | <2 |
| 4 | DMHPPD* + Wingstay 100 | 1.5 / 1 | >144 |

* N,N'-di-3-(methylheptyl)-p-phenylenediamine.

TABLE III

| Run No. | Additive | Concentration (Pts. by Wt.) | Hours to First Crack |
|---|---|---|---|
| 1 | None | | <2 |
| 5 | DMHPPD* | 2 | 3 |
| 6 | Wingstay 100 | 1 | <2 |
|   |   | 2 | <2 |
| 7 | DMHPPD* + Wingstay 100 | 2 / 1 | >168 |

* N,N'-di-3-(5-methylheptyl)-p-phenylenediamine.

From the data in Table II, it will be seen that the use of 1.5% by weight of N,N'-di-3-(5-methylheptyl)-p-phenylenediamine (DMHPPD) alone protected the rubber for only 3 hours at 10% elongation. However, the use of 1.5% by weight of this antiozonant in combination with 1% by weight of Wingstay 100 extended the crack-free life of the rubber to greater than 144. Similarly, the combination of this antiozonant and Wingstay 100 extended the crack-free life of the rubber to greater than 168 hours in the samples elongated 20%. As hereinbefore set forth, this effect is surprising because Wingstay 100 possesses substantially no antiozonant properties as evidenced by Run No. 3 and Run No. 6.

*Example II*

Additional samples of the rubber also were evaluated in outdoor tests. In these tests the strips of rubber were formed into a bent loop and mounted on a wooden board. The board then is placed on a panel exposed to the atmosphere. The panel is inspected periodically to determine the time to first crack.

Pertinent data from some of these evaluations are reported in the following table:

TABLE IV

| Run No. | Additive | Concentration (Pts. by Wt.) | Weeks to First Crack |
|---|---|---|---|
| 8 | None | | 1 |
| 9 | DMHPPD* | 1<br>1.5 | 7<br>34 |
| 10 | Wingstay 100 | 1<br>2 | 1<br>1 |
| 11 | DMHPPD*<br>+<br>Wingstay 100 | 1<br><br>1 | 38 |
| 12 | DMHPPD*<br>+<br>Wingstay 100 | 1<br><br>2 | 60 |
| 13 | DMHPPD*<br>+<br>Wingstay 100 | 1.5<br><br>1 | 60 |

* N,N'-di-3-(5-methylheptyl)-p-phenylenediamine.

Here again the synergistic effect of the combination of both the antiozonant and antioxidant is demonstrated. In all cases the combination of additives increased the stability of the rubber samples for a time considerably greater than obtained when using the antiozonant alone. As hereinbefore set forth, this effect is surprising because Wingstay 100 possesses substantially no antiozonant properties in itself as demonstrated by Run No. 10.

*Example III*

The synergistic mixture of this example comprises 75% by weight of N,N'-di-2-octyl-p-phenylenediamine and 25% by weight of N-phenyl-N'-ethylphenyl-p-phenylenediamine.

The synergistic mixture described above is incorporated in a concentration of 2.5% by weight in a natural rubber composition of the following recipe:

TABLE V

| Ingredient: | Parts by weight |
|---|---|
| Smoked sheet | 100 |
| Carbon black | 45 |
| Zinc oxide | 3 |
| Stearic acid | 3 |
| Sulfur | 2.5 |
| Accelerator * | 1.8 |

* N-cyclohexyl-2-benzothiazole-sulfenamide.

The ingredients are milled in the conventional manner and the composition then is cured for 40 minutes at 140° C.

*Example IV*

The synergistic mixture of this example comprises 70% by weight of N,N'-di-sec-nonyl-p-phenylenediamine and 30% by weight of N-phenyl-N'-propylphenyl-p-phenylenediamine. The synergistic mixture is incorporated in a concentration of 2.5% by weight in another sample of the rubber having the base formula set forth in Example I.

*Example V*

The synergistic mixture of this example comprises 60% by weight of N,N'-di-cyclohexyl-p-phenylenediamine and 40% by weight of N-phenyl-N'-methylphenyl-p-phenylenediamine. The synergistic mixture is incorporated in a concentration of 3% by weight in a rubber having the base formula set forth in Example I.

*Example VI*

The synergistic mixture of this example is composed of 65% by weight of N-isopropyl-N'-phenyl-p-phenylenediamine and 35% by weight of N-phenyl-N'-ethylphenyl-p-phenylenediamine. The synergistic mixture is incorporated in a concentration of 3% by weight in another sample of the rubber having the base formula set forth in Example III.

*Example VII*

The synergistic mixture of this example comprises 55% by weight of N-sec-octyl-N'-phenyl-p-phenylenediamine and 45% by weight of N-phenyl-N'-octylphenyl-p-phenylenediamine. The synergistic mixture is incorporated in a concentration of 3% by weight in another sample of the rubber having the base formula set forth in Example I.

I claim as my invention:

1. Vulcanizable diene hydrocarbon rubber normally subject to cracking due to ozone containing from about 0.5% to about 5% by weight of a mixture of from about 50% to about 90% by weight of an N,N'-di-sec-alkyl-p-phenylenediamine in which each of the alkyl groups contains from 8 to 12 carbon atoms and from about 50% to about 10% by weight of N-phenyl-N'-alkylphenyl-p-phenylenediamine in which the alkyl group contains from 1 to 12 carbon atoms.

2. Vulcanizable diene hydrocarbon rubber normally subject to cracking due to ozone containing from about 0.5% to about 5% by weight of a mixture of from about 50% to about 90% by weight of an N,N'-di-sec-octyl-p-phenylenediamine and from about 50% to about 10% by weight of N-phenyl-N'-alkylphenyl-p-phenylenediamine in which the alkyl group contains from 1 to 12 carbon atoms.

3. Vulcanizable diene hydrocarbon rubber normally subject to cracking due to ozone containing from about 0.5% to about 5% by weight of a mixture of from about 50% to about 90% by weight of an N,N'-di-3-(5-methylheptyl)-p-phenylenediamine and from about 50% to about 10% by weight of N-phenyl-N'-alkylphenyl-p-phenylenediamine in which the alkyl group contains from 1 to 12 carbon atoms.

4. Vulcanizable diene hydrocarbon rubber normally subject to cracking due to ozone containing from about 0.5% to about 5% by weight of an antiozonant mixture of from about 50% to about 90% by weight of N,N'-di-sec-octyl-p-phenylenediamine and from about 50% to about 10% by weight of N-phenyl-N'-ethylphenyl-p-phenylenediamine.

5. Vulcanizable diene hydrocarbon rubber normally subject to cracking due to ozone containing from about 0.5% to about 5% by weight of an antiozonant mixture of from about 50% to about 90% by weight of N,N'-di-3-(5-methylheptyl)-p-phenylenediamine and from about 50% to about 10% by weight of N-phenyl-N'-ethylphenyl-p-phenylenediamine.

6. Butadiene-styrene rubber normally subject to cracking due to ozone containing from about 0.5% to about 5% by weight of an antiozonant mixture of from about 50% to about 90% by weight of N,N'-di-sec-octyl-p-phenylenediamine and from about 50% to about 10% by weight of N-phenyl-N'-ethylphenyl-p-phenylenediamine.

7. Butadiene-styrene rubber normally subject to cracking due to ozone containing from about 0.5% to about 5% by weight of an antiozonant mixture of from about 50% to about 90% by weight of N,N'-di-3-(5-methylheptyl)-p-phenylenediamine and from about 50% to about 10% by weight of N-phenyl-N'-ethylphenyl-p-phenylenediamine.

8. Natural rubber normally subject to cracking due to ozone containing from about 0.5% to about 5% by weight of an antiozonant mixture of from about 50% to about 90% by weight of N,N'-di-sec-octyl-p-phenylenediamine and from about 50% to about 10% by weight of N-phenyl-N'-ethylphenyl-p-phenylenediamine.

9. A mixture of from about 50% to about 90% by weight of an N,N'-di-sec-alkyl-p-phenylenediamine in which each of the alkyl groups contains from 8 to 12 carbon atoms and from about 50% to about 10% by weight of N-phenyl-N'-alkylphenyl-p-phenylenediamine in which the alkyl group contains from 1 to 12 carbon atoms.

10. A mixture of from about 50% to about 90% by weight of an N,N'-di-sec-octyl-p-phenylenediamine and from about 50% to about 10% by weight of N-phenyl-N'-alkylphenyl-p-phenylenediamine in which the alkyl group contains from 1 to 12 carbon atoms.

11. A mixture of from about 50% to about 90% by weight of an N,N'-di-3-(5-methylheptyl)-p-phenylenediamine and from about 50% to about 10% by weight of N-phenyl-N'-alkylphenyl-p-phenylenediamine in which the alkyl group contains from 1 to 12 carbon atoms.

12. Antiozonant mixture of from about 50% to about 90% by weight of N,N'-di-sec-octyl-p-phenylenediamine and from about 50% to about 10% by weight of N-phenyl-N'-ethylphenyl-p-phenylenediamine.

13. Antiozonant mixture of from about 50% to about 90% by weight of N,N'-di-3-(5-methylheptyl)-p-phenylenediamine and from about 50% to about 10% by weight of N-phenyl-N'-ethylphenyl-p-phenylenediamine.

References Cited by the Examiner

UNITED STATES PATENTS

| | | | |
|---|---|---|---|
| 2,256,189 | 9/1941 | Bogemann et al. | 260—45.9 |
| 2,645,674 | 7/1953 | Kinney | 260—45.9 |
| 2,822,395 | 2/1958 | Dent | 260—45.9 |
| 2,984,646 | 5/1961 | Wilson | 260—45.9 |
| 3,027,315 | 3/1962 | Lichty | 260—45.85 |
| 3,057,819 | 10/1962 | Kibler | 260—45.9 |
| 3,126,412 | 3/1964 | Stahly | 260—45.9 |

OTHER REFERENCES

Waddy, F. W., U.S. Dept. of Agr. Bu. Ent. Plant Quarantine, ET223, 1945.

LEON J. BERCOVITZ, *Primary Examiner.*

MILTON STERMAN, *Examiner.*

H. E. TAYLOR, *Assistant Examiner.*